Jan. 5, 1965

T. R. HERRMANN 3,164,274

HIGH LIFT TRAILER

Filed Sept. 25, 1961

INVENTOR.
THOMAS R. HERRMANN
BY
Naylor & Neal
ATTORNEYS

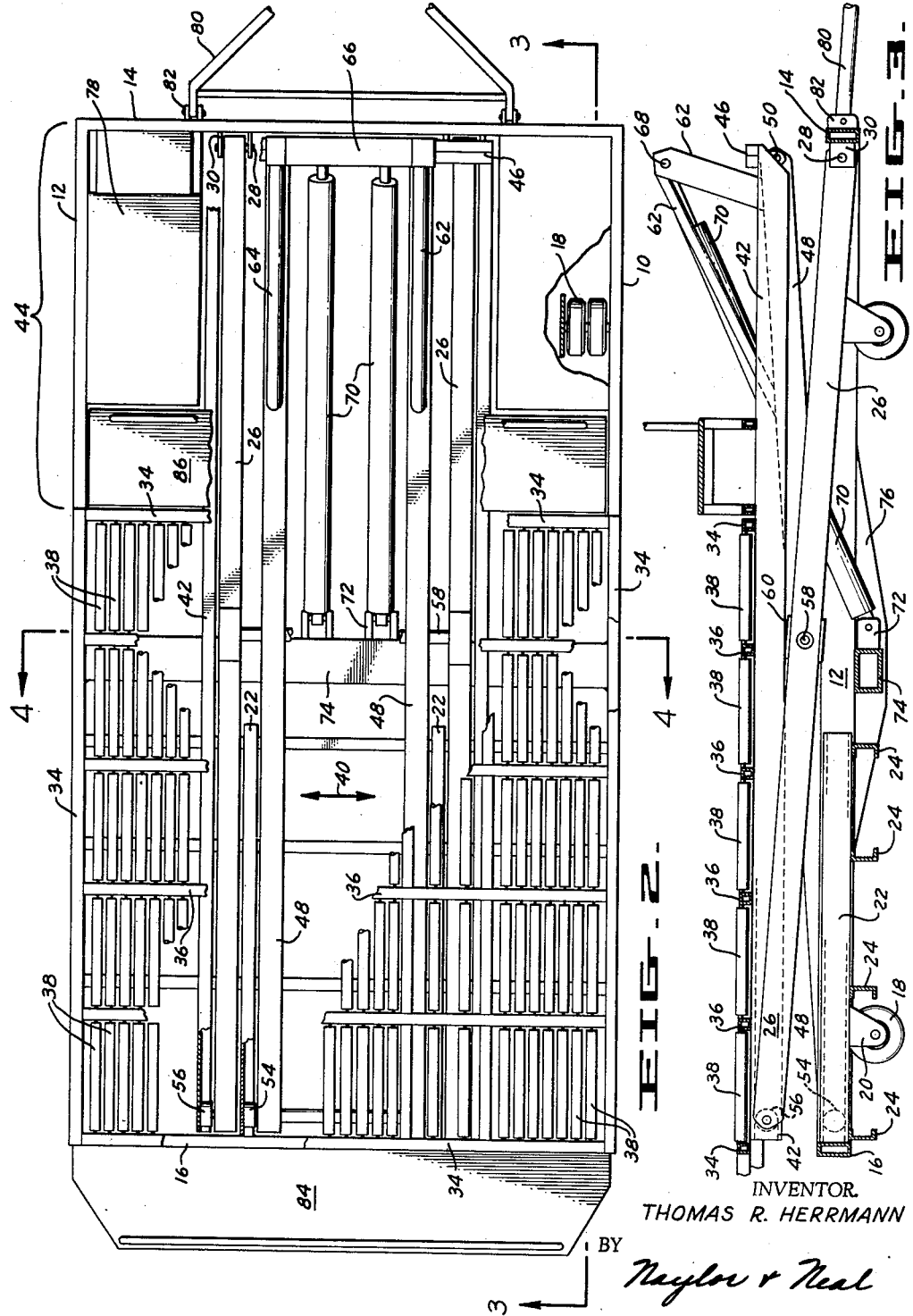

United States Patent Office 3,164,274
Patented Jan. 5, 1965

3,164,274
HIGH LIFT TRAILER
Thomas R. Herrmann, Pacific Grove, Calif., assignor to Cochran Equipment Company, Salinas, Calif., a corporation of California
Filed Sept. 25, 1961, Ser. No. 140,516
3 Claims. (Cl. 214—512)

This invention relates to load handling apparatus and more particularly to a low overhead high lift trailer which is particularly adapted for use as an elevator when loading freight and the like into aircraft.

It is a principal object of the invention to provide load lifting apparatus having minimum height to facilitate loading of materials thereon at a low level and being capable of lifting the loaded materials to a maximum elevation. It is another object of the invention to provide such a low overhead high lift apparatus which is capable of handling very large loads whereby materials to be handled may be assembled into large standard containers and the containers then lifted by the apparatus.

It is another object of the invention to provide such apparatus which is particularly well adapted for loading freight into aircraft with the freight being pre-assembled into large modules and the modules then loaded and unloaded directly on the aircraft so that the freight carrying aircraft is delayed for only a minimum time during loading and unloading.

It is another object of the invention to provide such a low overhead high lift apparatus which is particularly useful as a trailer adapted to be parked beside an aircraft fuselage and employed as an elevator for moving freight between the aircraft fuselage and low overhead shuttle vehicles used on the ground.

Other objects and advantages of the invention will become apparent from the following description read in conjunction with the attached drawings in which:

FIG. 2 is a top plan view of the apparatus of FIG. 1 with the apparatus of FIG. 1 moved to its low overhead position;

FIG. 3 is a view in side elevation of the apparatus of FIGS. 1 and 2 with the elements of the apparatus adjusted slightly from the low overhead position.

Figure 4:
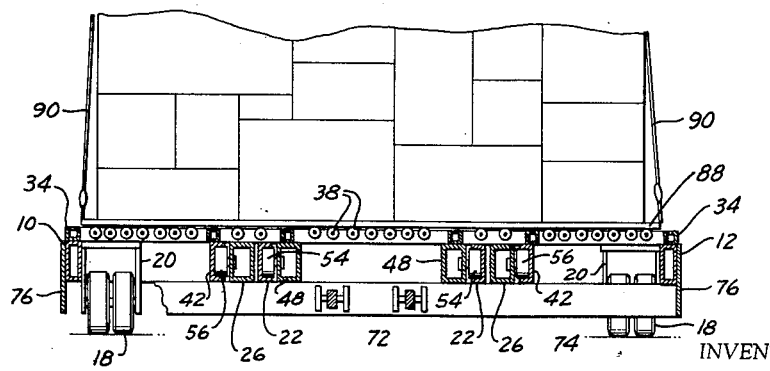
FIG. 4 is a vertical sectional view of the apparatus of FIG. 2 taken along the plane and in the direction indicated at 4—4 in FIG. 2 and illustrating the apparatus in the condition in which it is shown in FIG. 2.

Referring now in detail to the drawings, the particular embodiment of the apparatus of this invention illustrated therein comprises a chassis having peripheral structural members 10, 12, 14 and 16 defining a generally rectangular peripheral frame with ground engaging wheels 18 mounted thereon by brackets 20 and supporting the peripheral frame closely adjacent to the ground. A pair of inner channel members 22 (see FIG. 2) are rigidly mounted on the chassis by means of cross braces 24 extending between the side frame members 10 and 12. A pair of outer arms 26 are pivotally connected to the chassis by means of pivot pins 28 and brackets 30 attached to the inner side of the peripheral frame member 14. As best seen in FIG. 4, the channels 22 and arms 26 lie in substantially the same plane and completely inside the peripheral frame of the chassis, that is with the top surfaces of the channels and arms lying below the top surface of the peripheral frame.

Figure 1:
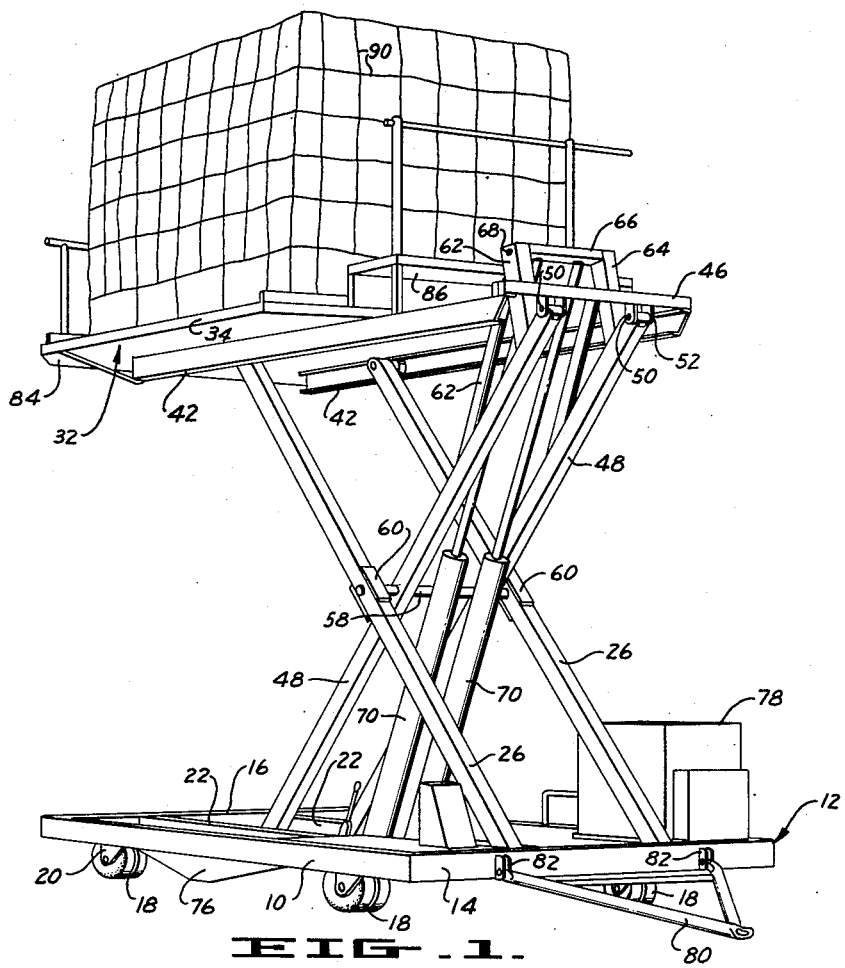
FIG. 1 is a perspective view of low overhead high lift apparatus constructed in accordance with this invention with the apparatus illustrated in its high lift position.

A load carrying platform indicated generally at 32 in FIG. 1 is constructed of peripheral brace members 34 and cross brace members 36 (see FIG. 2) with the cross brace members supporting anti-friction rollers for free rotation about axes which extend generally parallel to the side members 10 and 12 for facilitating movement of a load across the platform 32 in the direction of the arrows 40 in FIG. 2. The cross brace members 36 are additionally supported upon a pair of outer channel members 42 with the length of the channel members 42 being substantially greater than the length of the platform 32 so that the platform 32 covers a portion of the chassis of the trailer and the channel members 42 extend from this covered portion to overlap a relieved or uncovered portion (indicated at 44 in FIG. 2) of the chassis. A cross brace member 46 interconnects the free ends of the channel members 42 in the relieved area 44, and a pair of inner arms 48 are pivotally connected to the brace 46 by means of pivot pins 50 and brackets 52. The inner arms 48 carry on their free ends rollers 54 which are received in the inner channel 22 on the chassis, and the outer arms 26 carry on their free ends rollers 56 which are received in the channels 42 as best seen in FIG. 4. The inner and outer arms 48 and 26 are pivotally connected together at their midpoints by a shaft 58 with the arms carrying suitable reinforcing collars 60 (see FIG. 1) adjacent thereto if desired, whereby the arms 26 and 48 maintain the platform 32 parallel to the chassis at all positions of elevation of the platform 32 above the chassis.

It will be noted from FIG. 4 in particular that all of the arms and channels 26, 48, 22, and 42 lie completely within the peripheral frame of the chassis and parallel to each other when the platform 32 is in its lower position, and in this position the platform 32 rests directly upon the peripheral frame of the chassis. This arrangement of the arms and channels provides minimum overhead of the platform 32 when it is in its lowered position.

It should be noted that a pair of triangular brace extenders 62 and 64 are provided on the inner arm 48 in the uncovered area 44 of the chassis with the braces 62 and 64 extending to positions above the level of the platform 32 as best seen in FIG. 3. A brace 66 is pivotally connected between the members 62 and 64 by means of a shaft 68 adjacent to the tops of the braces 62 and 64 and a pair of hydraulic rams 70 are connected at their upper ends to the brace 66 and at their lower ends to brackets 72 which are attached to a cross beam 74 which is welded to the side peripheral beams 10 and 12 and skirts 76 carried thereby. The cross beam 74 is additionally supported by tension links (for clarity of illustration not shown) extending between the member 74 and the peripheral frame member 14 at the front of the trailer. The tension links (not shown) supply structural strength to withstand the initial thrust of the rams 70 when a load is lifted. Fluid under pressure is supplied to the rams 70 through suitable flexible tubes from an electrical pump driven by an internal combustion engine with these elements mounted in a housing 78 on the chassis of the trailer with the housing 78 positioned at the side of the trailer to permit movement of the outer arms 48, etc., adjacent thereto.

Suitable switches, not shown, are mounted on the platform 32 and the chassis for controlling operation of the pump which supplies fluid to the rams 70 so that raising and lowering of the platform 32 may be controlled both from the ground and from the platform. The trailer may also be provided with suitable sensing means mounted on the platform 32 for adjusting the elevation of the platform 32 automatically to the level of a door in an aircraft fuselage when the platform 32 is in its elevated position. Suitable sensing means of this type being shown in the application of Bradshaw et al., Serial No. 852,863, filed November 13, 1959, now Patent No. 3,066,817.

A trailer hitch 80 is mounted on the front peripheral frame member 14 for moving the load lifting apparatus, suitable brackets 82 being provided for the trailer hitch 80, and one pair of ground engaging wheels, preferably the front wheels adjacent to the trailer hitch 80, are provided with caster mountings to simplify steering of the trailer.

A pair of walkways 84 and 86 at the back and front of the platform 32 are provided to facilitate handling of loads on the platform 32 when the platform is in an elevated position adjacent to the fuselage of an aircraft. Additionally, some or all of the rollers 38 on the platform 32 may be provided with drive means for moving loads onto and off of the platform 32 by a suitable power drive. It should be noted that the front walkway 86 lies over the relieved or uncovered area 44 of the chassis, and the walkway 86 is positioned above the level of the platform 32 to provide clearance for the rams 70 when the platform is in its low overhead position.

When the apparatus is used for loading and unloading aircraft, it is moved to the side of an aircraft fuselage by a suitable tractor with the platform positioned adjacent to and immediately below a freight door in the side of the fuselage. Freight to be loaded in the aircraft is then positioned at the side of the platform 32 away from the aircraft by suitable shuttle vehicles with the freight mounted on a suitable pallet 88 (see FIG. 4) and held on the pallet by suitable strapping 90. The freight on the pallet 88 is then shifted laterally onto the platform 32 with the aid of the anti-friction rollers 38 or power means driving the rollers. With the freight and pallet 88 supported on the conveyor, the fluid pump connected to the rams 70 is energized to expand the ram and lift the platform 32 to a position adjacent to the cargo door of the aircraft. It should here be noted that while low overhead is provided for the platform 32, with the arms and channels parallel to each other, the initial line of action of the rams 70 when lifting the platform 32 from its low overhead position is inclined at a substantial angle to the common plane of the arms and channels so that effective lifting of heavy loads is accomplished. With the platform 32 positioned adjacent to the cargo door of the aircraft, the pallet 88 and cargo is rolled off of the platform 32 from the side opposite that from which it was received, and the platform 32 is then lowered to its low overhead position to receive another pallet 88 from another shuttle vehicle. The procedure employed for discharging cargo from the aircraft is obviously the reverse of the procedure described above.

While one specific embodiment of this invention has been illustrated and described in detail herein, it is obvious that many modifications of the apparatus disclosed may be made without departing from the spirit and scope of the invention.

I claim:

1. Low overhead, high lift apparatus comprising: a lower section comprising a chassis, ground engaging wheels on said chassis for supporting said chassis closely adjacent to the ground, a pair of generally parallel arms each having a first end pivotally connected to said chassis and a second end with a roller mounted on said second end, and a pair of channel members mounted on said chassis generally parallel to said arms with said channel members and said arms lying in substantially the same horizontal plane; an upper section comprising a support frame positioned above said chassis with a load supporting platform portion thereof adjacent to one end of said chassis and a relieved portion adjacent to the other end of said chassis, a second pair of generally parallel arms each having a first end pivotally connected to said support frame and a second end with a roller mounted on said second end and received in one of said channels, and a second pair of channels mounted on said support frame generally parallel to said second arms and receiving said rollers on said first arms, with said second pairs of arms and channels lying in substantially the same plane as said first pairs; rigid extension means mounted on said second set of arms extending therefrom into said relieved portion of said support frame; pivot means pivotally connecting each of the arms of one pair to one of the arms of the other pair at a point intermediate of said ends of said arms; and lift means for raising said upper section above said lower section comprising ram means pivotally connected to said lower section at an area under said platform portion and pivotally connected to said extension means in said relieved portion with the direction of action of said ram means being inclined to said plane.

2. A lower overhead high lift trailer for loading freight and the like on aircraft which comprises: a chassis having a generally rectangular peripheral frame, ground engaging wheels mounted on said chassis for supporting said frame closely adjacent to the ground, an outer pair of generally parallel arms having first ends thereof pivotally connected to said chassis and lying substantially completely inside of said peripheral frame, an inner pair of channels mounted on said frame generally parallel to said arms when the arms are in a collapsed position and lying substantially completely inside of said peripheral frame between said arms, a load supporting platform resting on and covering the upper surface of said peripheral frame adjacent to one end of said peripheral frame leaving the other end of said peripheral frame uncovered, an outer pair of channels attached to said platform and lying substantially completely inside of said peripheral frame and extending beyond said platform to a position adjacent to said uncovered end of said frame, said outer channels lying adjacent to said outer arms with said rollers on said outer arms received in said outer channels, brace means connecting the ends of said outer channels adjacent to said uncovered end of said peripheral frame, a pair of inner arms positioned substantially completely inside of said peripheral frame adjacent to said inner channels with first ends of said inner arms pivotally connected to said brace means between said outer channels and second ends of said inner arms carrying rollers which are engaged in said inner channels, rigid support means attached to said inner arms adjacent to said uncovered end of said peripheral frame with said support means extending upwardly from said arms to positions above the level of said platform, expandable ram means pivotally connected at one end to said chassis under said platform and pivotally connected at its other end to said support means at a point above the level of said platform, and pivot means pivotally connecting each of said inner arms to the adjacent one of said outer arms about pivotal axes intermediate of the ends of said arms.

3. The apparatus of claim 2 characterized further by the inclusion of anti-friction roller means mounted on the upper surface of said platform with said rollers mounted for rotation about axes generally perpendicular to said ends of said peripheral frame for facilitating delivery of a load to said platform from one side thereof when said platform rests on said frame and delivery of said load from the other side of said platform when said platform is elevated to the level of an aircraft fuselage.

References Cited in the file of this patent

UNITED STATES PATENTS

| | | |
|---|---|---|
| 1,931,484 | Bosserdet et al. | Oct. 24, 1933 |
| 2,379,094 | Maxon | June 26, 1945 |
| 2,714,967 | Olsen | Aug. 9, 1955 |
| 2,829,863 | Gibson | Apr. 8, 1958 |
| 2,883,079 | Binns | Apr. 21, 1959 |
| 2,889,172 | Hoff | June 2, 1959 |
| 2,935,218 | Fritz | May 3, 1960 |
| 3,094,351 | Gwinn | June 18, 1963 |